Feb. 23, 1965     I. B. RACHMAN     3,170,710

VERSATILE ALL-PURPOSE INSTRUMENT DOLLY

Filed Nov. 23, 1962     2 Sheets-Sheet 1

INVENTOR.
ISADORE B. RACHMAN
BY *Arthur H. Seidel*
ATTORNEY

Feb. 23, 1965  I. B. RACHMAN  3,170,710
VERSATILE ALL-PURPOSE INSTRUMENT DOLLY
Filed Nov. 23, 1962  2 Sheets-Sheet 2
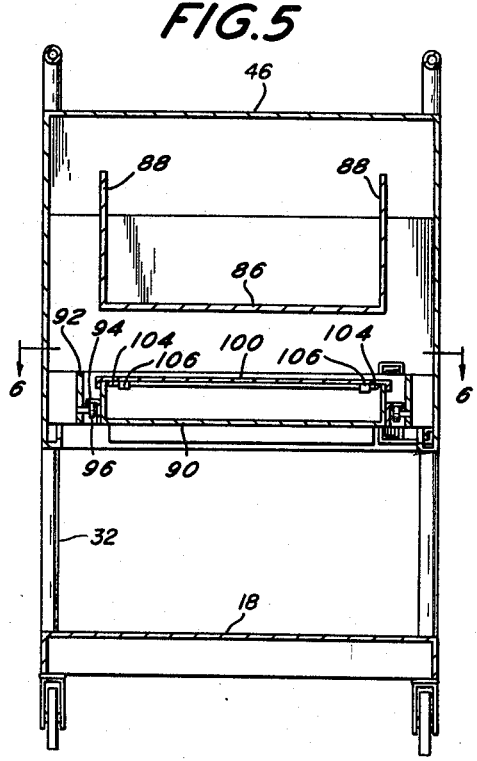
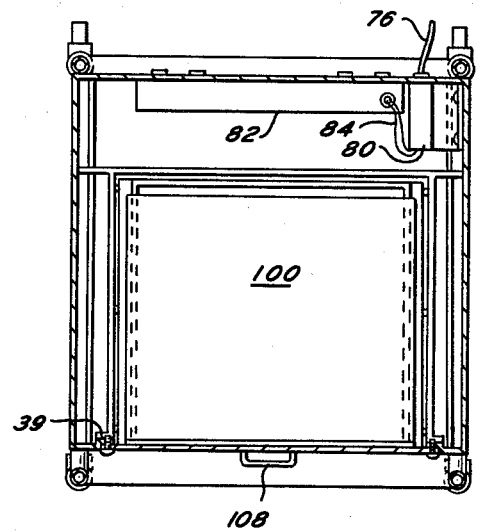
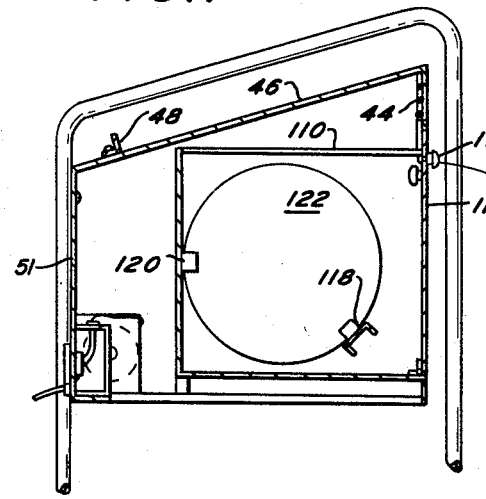
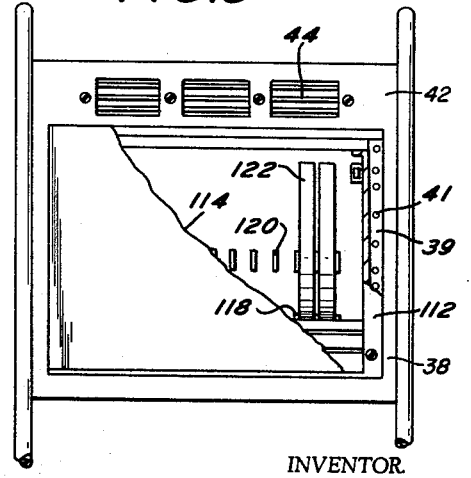
INVENTOR.
ISADORE B. RACHMAN
BY Arthur H. Seidel
ATTORNEY United States Patent Office 3,170,710
Patented Feb. 23, 1965

3,170,710
VERSATILE ALL-PURPOSE INSTRUMENT DOLLY
Isadore B. Rachman, Philadelphia, Pa., assignor to Metal Dynamics Inc., Philadelphia, Pa., a corporation of Pennsylvania
Filed Nov. 23, 1962, Ser. No. 239,445
6 Claims. (Cl. 280—79.2)

This invention relates to a versatile all-purpose instrument dolly, and more particularly to an instrument dolly capable of having mounted thereon rack-mounted instruments as well as shelf-type instruments with minimum heat transfer between them.

Electronic instruments fall into two general mounting categories. First, there are those instruments which have an integral flange extending around the face thereof which can be secured by screws, bolts, or other fasteners to a permanent or movable rack. These are known as rack-mounted instruments. The second type of instruments are those which have no integral flange and are adapted to be placed on a shelf-type support with minimal securement. In the interests of uniformity, and at the insistence of their customers, most manufacturers of electronic instruments have agreed to certain standard rack-mount dimensions so that a standard electronic instrument rack will support any type of rack-mounted instrument. No such standard relationships are used in the manufacture of instruments adapted to be placed on shelf-type supports.

There is a need for providing transportable supports for all types of electronic instruments. This allows a great deal of versatility and ease of access for the engineer or scientist using the instruments. In the past, movable supports have been provided which are designed for the particular type of instrument to be transported. That is, their dimensions are such that they will only be useful for a particular instrument of a particular size. They are not capable, for instance, of carrying either a rack-mounted instrument or a shelf-supported instrument.

Where an electronic instrument utilizes a great deal of power, it generates a large amount of heat during use. This heat is usually dissipated by fans within the instrument itself. However, when more than one instrument was mounted on the movable supports utilized in the past, there was a build-up of heat caused by the close proximity of the instruments one to another.

In addition, personnel using a movable support had to provide a separate writing area for recording the readings on the instruments. This was inconvenient. If a movable support was designed with an area for writing, it limited the variety of instruments which could be transported and wasted valuable space on the support.

Therefore, it is the general object of this invention to avoid and overcome the foregoing and other difficulties of the prior art practices by the provision of a new and improved all-purpose instrument dolly.

Another object of this invention is to provide a new and improved all-purpose instrument dolly that can be utilized with rack-mounted instruments as well as shelf-type instruments.

A further object of this invention is to provide a better all-purpose instrument dolly which will thermally isolate instruments carried on top of the dolly from those carried within the dolly.

A still further object of this invention is to provide a better all-purpose instrument carrier having an easily securable writing surface which may be stored away when not in use.

Other objects will appear hereinafter.

For the purpose of illustrating the invention, there are shown in the drawings forms which are presently preferred; it being understood, however, that this invention is not limited to the precise arrangements and instrumentalities shown.

FIGURE 5 is a cross sectional view of the instrument dolly shown in FIGURE 3 taken along lines 5—5.

FIGURE 6 is a top cross sectional view of the instrument dolly shown in FIGURE 5 taken along lines 6—6.

FIGURE 7 is a cross sectional view of the instrument dolly shown in FIGURE 3 with a tape storage unit installed therein.

FIGURE 8 is a front partially cutaway view of the instrument dolly of FIGURE 7 with the inside of the tape storage attachment exposed.

Figure 1:
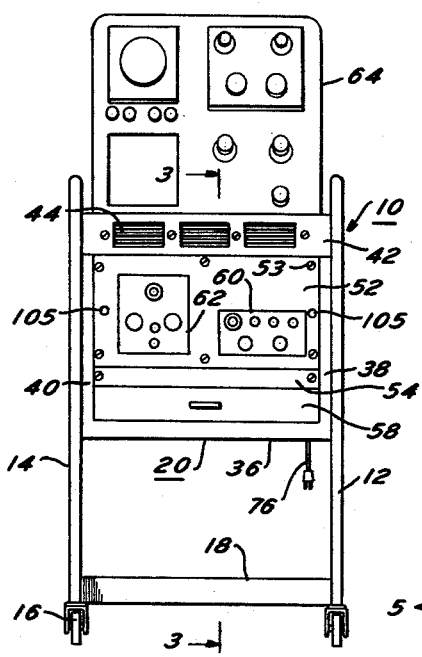
FIGURE 1 is a front elevational view of the instrument dolly of the present invention fully loaded with instruments.

In the drawings, there is shown an instrument dolly built in accordance with the principles of the present invention and generally designated by the numeral 10. Like numerals in the drawings will indicate like elements.

The dolly 10 has right and left support rails 12 and 14 respectively mounted on ball bearing swivel casters and solid rubber wheels 16. Between the support rails 12 and 14 is secured a metal base portion 18 which may be utilized as a storage pan for tools, manuals or additional instruments if desired.

An open bottom instrument housing 20 is also provided which is secured to the side rails 12 and 14 by short lengths of welded tubing 22 and 24 and bolts 26 and 28. The tubing 22 and 24 is secured to the long leg 30 of side supports 12 and 14. The short upright leg 32 of the side supports 12 and 14 has the housing 20 secured thereto by the bolts 26 and 28.

Side supports 12 and 14 are formed of a continuous stainless steel hollow tubing shaped to form a long upright member 30 and a short upright member 32 joined by an angled top member 34. The upright legs 30 of supports 12 and 14 are at the front of the dolly.

The housing 20 has an open bottom and a partially open front wall. The front wall has a bottom strip 36, side edges 38 and 40, and top strip 42 which define a rectangular opening. Integral with the side edges 38 and 40 are mounting flanges 39 spaced between the front and back walls of the housing 20 in a plane parallel to the front wall. The mounting flanges 39 have holes 41 along the length thereof for securing rack-mounted instruments to the housing. By spacing the flange 39 from the front wall of the housing 20, instruments mounted on the mounting flanges 39 would have their front face flush with the front wall thereby creating a pleasing appearance for the dolly. Most manufacturers of electronic instruments make their units conform to government standards. The government standard for the space between flanges 39 is 17¾ inches plus ⅟₁₆ or minus zero inches.

The top strip 42 has louvers 44 therein for purposes which will be discussed below.

The housing 20 has a top wall 46 running at an angle of 20° to the horizontal from the back wall 51 of the housing 20 to the uppermost edge of the top strip 42. The top wall 46 is adapted to support an oscilloscope or other instrument thereon. For this purpose, an I-bracket 48 is provided which is secured near the back of the top wall 46. It can easily be understood that other types of securing means might be utilized on the top wall 46 for mounting other types of instruments.

When the dolly 10 is fully loaded, an instrument is mounted on the top wall 46 as well as secured to the mounting flanges 39. An opening 50 is provided in the bottom wall of the housing 20 so that heat generated by the instruments can be dissipated by a chimney-like flow of air through the opening 50 up the back wall 51 and top wall 46 and out through the louvers 44. This chimney effect thermally isolates instruments within the housing 20 from instruments on top of the top wall 46. This thermal isolation is necessary so as to prevent interaction of the heat generated by the instruments. Prior instrument dollys had the louvers placed on the top wall 46 thereby causing heating of the bottom of an instrument carried on the top wall 46. The apparatus of the present invention has eliminated this problem while increasing the heat dissipation properties of the dolly.

If a rack-mounted instrument is not desired for the housing 20, and normal shelf-supported instruments are to be utilized, a template 52 may be secured to the flanges 39 by screws 53. If the shelf-supported instruments are small, the template 52 need not completely cover the opening in the front wall of the housing 20. Rather, by utilizing a spacer 54, a drawer 58 may be installed immediately below the instruments. The drawer 58 is installed by securing a frame 56 to the flanges 39. The drawer 58 will be horizontally reciprocal in the frame 56 in a manner to be discussed below.

The template 52, spacer 54 and drawer 58 are flush with side portions 38 and 40 of the front wall of the housing 20. Thus, they provide a smooth outward appearance for the dolly. Within the template 52, the instruments 60 and 62 are mounted in a manner to be discussed below.

Figure 2:
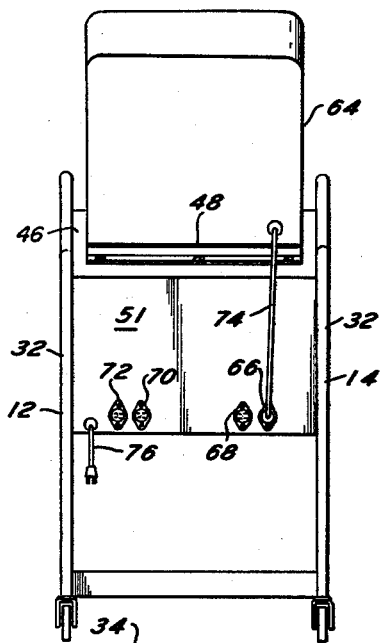
FIGURE 2 is a back elevational view of the instrument dolly shown in FIGURE 1.

On the top wall 46, there is placed an oscilloscope which rests against angle iron 48 at an angle of 20° to the horizontal. The mounting of the instruments on the dolly has only been shown in FIGURES 1 and 2, the instruments being removed for purposes of clarity in FIGURES 3-6.

On the back wall of the housing 51, there are provided four female plug connectors 66, 68, 70 and 72. The power cord 74 of the oscilloscope 64 is adapted to be connected into one of the female plug connectors 66. A three wire electrical cord 76 is provided equipped with a three prong plug. This cord 76 is wound on a reel 78 mounted within a metal casing 80 in the housing 20. The cord 76 is completely insulated with its third wire grounded to the reel so that the dolly is automatically grounded.

The connectors 66, 68, 70 and 72 are placed within a metal casing 82. A suitable wire 84 is utilized to connect the connectors 66, 68, 70 and 72 to the input from the cord 76. When instruments are within the housing 20, they can be easily wired to the connectors 68, 70 and 72.

The shelf-mounted units 60 and 62 are held in place on the template 52 by a shelf 86 integral with the back of the template 52 and extending perpendicular from the plane of the template. The shelf 86 has vertical side supports 88 to prevent side slippage of the instruments within the housing.

Figure 3:
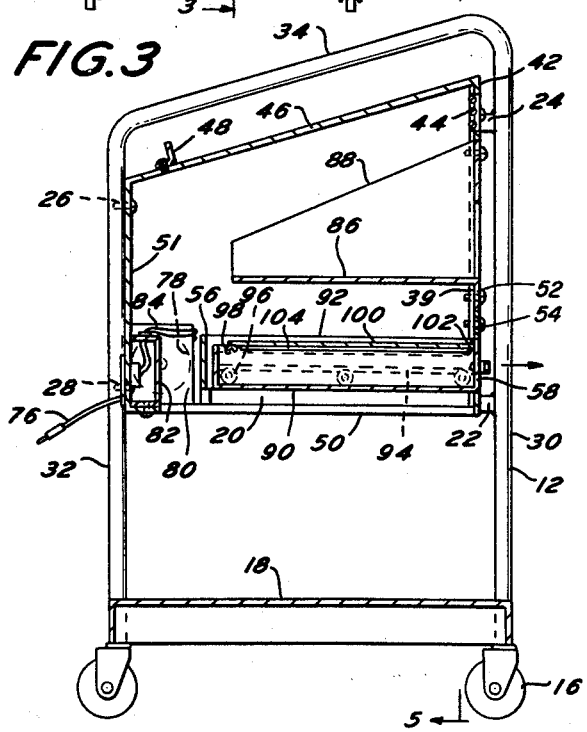
FIGURE 3 is a cross sectional view of the instrument dolly of FIGURE 1 taken along the line 3—3 with the instruments removed.

The drawer 58 includes a main body 90 adapted to be supported by side walls 92 of frame 56. The side of main body 90 have flange 94 thereon. Additionally, the side wall 92 has Teflon rollers 96 which cooperate with flanges 94 for providing smooth movement of the drawer 58. A separate writing surface 100 having an integral hook 98 along the leading edge thereof is shown in FIGURES 3, 5 and 6 in position on the drawer 58. The edge of the writing surface 100 opposite the hook 98 has a hinge member 102 for securing a pair of support arms 104. The arms 104 are releasably secured to the writing surface 100 by spring members 106.

Figure 4:
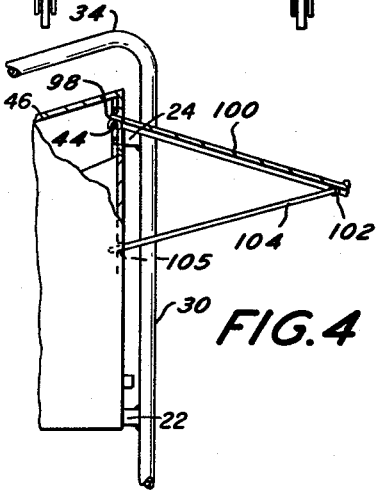
FIGURE 4 is a cross sectional view of the instrument dolly of the present invention similar to FIGURE 3 with the writing surface in one of its operative positions.

When the drawer 58 is open, the writing surface 100 can be removed and placed in the position shown in FIGURE 4. In this position, the hook 98 fits over a portion of the vent 44 while the arms 104 are retracted from the spring members 106 and pivoted about hinge 102. The ends of the arms 104 opposite from the hinge 102 are placed in suitable holes 105 provided in the template 52.

Thus, the writing surface 100 can be utilized in two positions. If the user of the dolly wishes to take readings from the oscilloscope 64, he places the writing surface in the position shown in FIGURE 4. In this position, the writing surface is immediately below the oscilloscope for easy access. In the alternative, the writing surface may be placed in the position shown in FIGURES 3, 5 and 6 and the drawer 58 opened so that one utilizing the instruments 62 and 60 can take readings while making notations on paper supported by the writing surface 100 immediately below the instruments. Of course, it will be readily understood that a handle 108 can be provided as shown to aid in the movement of the drawer 58.

Thus, the dolly 10 is shown to be useful to mount either a rack-mounted instrument directly to the flanges 39 or to mount shelf-mounted instruments through the use of the template 52 with its integral shelf unit 86.

In addition, a tape storage housing 110 may be mounted on the flanges 39 as shown in FIGURES 7 and 8. The tape storage housing 110 has an integral peripheral flange 112 which mounts on the flange 39. A pivotal mounted door 114 is provided for the storage housing 110 having a handle 116. The door 114 is held in place by a suitable magnetic catch.

The back wall of the housing 110 has spaced supports 120 secured thereto. From side wall to side wall of the housing 110, there is provided a bar 118 having spaced supports thereon similar to supports 120. A tape container 122 fits into the supports on bar 118 and between supports 120 as shown. Thus, the movable instrument dolly can also be utilized for movable tape storage such as is necessary at computer installations and the like. The chimney effect discussed previously is also effective in the unit shown in FIGURES 7 and 8 for maintaining heat isolation between the tape storage housing 110 and any instrument mounted on the upper wall 46.

The present invention may be embodied in other specific forms without departing from the spirit or essential attributes thereof and, accordingly, reference should be made to the appended claims, rather than to the foregoing specification as indicating the scope of the invention.

I claim:

1. A movable instrument dolly comprising a hollow housing, wheels, means for mounting said housing on said wheels, the bottom of said housing being at least partially open, said housing having a front wall and back wall parallel thereto, said housing also having side walls parallel to each other and perpendicular to said front and back walls, said front wall having an upper edge higher than the upper edge of said back wall, a top wall connecting the upper edges of said back, front and side walls, said top wall having support means thereon for supporting instruments on top of said housing, said front wall having a rectangular opening therein, the side edges of said rectangular opening having integral flanges extending toward the center of said opening, said flanges lying in a plane between said front and back walls, said flanges having a plurality of holes therein for mounting purposes, and connector means secured to said housing for receiving electrical power adapted to be supplied to instruments mounted on said housing.

2. The movable instrument dolly of claim 1 including a template, said template having a thickness equal to the space between the plane of said flange and the plane of said front wall, said template having a width of the rectangular opening in said front wall, said template having rectangular openings therein for receiving instruments to be mounted in said housing, an integral support extending perpendicular to the frame of said template along said bottom edge of the rectangular template openings, said support having side edges perpendicular to said support and said template along at least one side edge of the rectangular opening in said template, mounting holes along the side edges of said template, and securement means for securing said template to said flanges through corresponding holes in said template and said flanges whereby instruments may be mounted in the rectangular openings in said template.

3. The movable instrument dolly of claim 1 including vent means on said front wall, said vent means being located below the upper edge of said front wall and above the rectangular opening in said front wall, the bottom of said housing having an opening adjacent the back wall of said housing, whereby a flow path may be established through the opening in said housing along the back and top walls through said vent means.

4. A movable instrument dolly comprising a hollow housing, wheels, means for mounting said housing on said wheels, the bottom of said housing being at least partially open, said housing having a front wall and a back wall parallel thereto, said housing also having side walls parallel to each other and perpendicular to said front and back walls, said front wall having an upper edge higher than the upper edge of said back wall, a top wall connecting the upper edges of said back, front and side walls, said top wall having support means thereon for supporting instruments on top of said housing, said front wall having a vent therein adjacent the upper edge thereof, said front wall also having a rectangular opening therein spaced below said vent, means for mounting instruments within said housing on said front wall, and a flow passage within said housing extending from said vent along said top and back walls to the opening in the bottom of said housing, and a plurality of connector means secured to said housing for receiving electrical power adapted to be supplied to instruments mounted on said housing.

5. The movable instrument dolly of claim 4 wherein said mounting means includes templates mounted within the rectangular opening on said housing, and further including a writing surface, said writing surface having a securing means along a first edge thereof for securing said first edge to said vent, said writing surface having a second edge juxtaposed to said first edge, and at least one pivotal strut hinged adjacent said second edge, said pivotal strut having its free edge secured to said template to support said writing surface.

6. The movable instrument dolly of claim 5 including a drawer, said mounting means being adapted to support said drawer in the rectangular opening on said front wall, said drawer having spaced upper side edges, said writing surface having a width slightly greater than the space between said drawer side edges, strut securement means on the bottom surface of said writing surface, said strut being adapted to be secured to the bottom of said writing surface when said writing surface is mounted on the side edges of said drawer.

References Cited by the Examiner
UNITED STATES PATENTS

| | | | |
|---|---|---|---|
| 2,039,901 | 5/36 | Hawley | 312—209 |
| 2,597,970 | 5/52 | Bollettieri | 312—223 X |
| 2,726,913 | 12/55 | Freeman | 280—79.2 X |
| 2,840,435 | 5/58 | Campbell | 312—223 X |
| 2,897,487 | 7/59 | Owen | 312—236 X |
| 2,969,268 | 1/61 | Mason et al. | 312—7 |
| 3,012,835 | 12/61 | Anderson et al. | 312—7 X |
| 3,042,384 | 7/62 | Bauman | 312—236 X |

A. HARRY LEVY, *Primary Examiner.*